United States Patent [19]

Leak et al.

[11] Patent Number: 5,375,127
[45] Date of Patent: Dec. 20, 1994

[54] METHOD AND APPARATUS FOR GENERATING REED-SOLOMAN ERROR CORRECTING CODE ACROSS MULTIPLE WORD BOUNDARIES

[75] Inventors: Daniel P. Leak; John R. Kloeppner, both of Wichita, Kans.

[73] Assignee: NCR Corporation, Dayton, Ohio

[21] Appl. No.: 856,613

[22] Filed: Mar. 25, 1992

[51] Int. Cl.[5] ...................... H03M 13/00; G06F 11/00
[52] U.S. Cl. .................................. 371/40.1; 371/37.5; 371/37.6
[58] Field of Search ................ 371/40.1, 35, 37.1, 371/37.2, 37.4, 37.6, 37.5

[56] References Cited

U.S. PATENT DOCUMENTS

| | | | |
|---|---|---|---|
| 4,450,561 | 5/1984 | Götze et al. | 371/37 |
| 4,454,600 | 6/1984 | La Grasley | 371/25 |
| 4,633,471 | 12/1986 | Perera et al. | 371/38 |
| 4,730,321 | 3/1988 | Machado | 371/38 |
| 4,775,978 | 10/1988 | Hartness | 371/38 |
| 4,882,731 | 11/1989 | van Gils | 371/37.6 |
| 4,937,828 | 7/1990 | Shih et al. | 371/37.1 |
| 4,979,173 | 12/1990 | Geldman et al. | 371/39.1 |
| 5,103,451 | 4/1992 | Fossey | 371/37.6 |
| 5,107,503 | 4/1992 | Riggle et al. | 371/37.1 |
| 5,134,619 | 7/1992 | Henson et al. | 371/40.1 |
| 5,136,592 | 8/1992 | Weng | 371/39.1 |
| 5,280,488 | 1/1994 | Glover | 371/37.1 |
| 5,282,215 | 1/1994 | Hyodo et al. | 371/42 |

OTHER PUBLICATIONS

J. W. Clough, Semi-Parallel Generation of CRC Character, Feb. 9, 1977, pp. 3555-3556.

*Primary Examiner*—Robert W. Beausoliel, Jr.
*Assistant Examiner*—Norman M. Wright
*Attorney, Agent, or Firm*—James M. Stover

[57] ABSTRACT

An error correction code (ECC) generator/checker for processing high bandwidth data block transfers. The high bandwidth ECC generator/checker logic includes a plurality stages, each stage including Reed-Solomon Cyclic Redundancy Check (RS CRC) code logic for processing a single data word. The stages can be configured to operate in parallel to process multiple-word parallel, high bandwidth transfers, or individually wherein each stage processes data in a word-serial manner. Each stage includes a first input for receiving a respective word portion of a multiple-word transfer, a second input for receiving either an intermediate ECC value from a previous stage or a feed back value, means for combining data words received at the first and second inputs, an alpha multiplier and an output for providing an ECC word.

When configured to operate in high bandwidth mode the output of the stages are connected in series such that the first stage output is connected to the second input of the second stage, the second stage output is connected to the second input of the third stage, and so on. The output of the final stage is fed back to the second input of the first stage. When configured to operate in a word-serial manner, the output for each stage is fed back to its second input.

7 Claims, 8 Drawing Sheets

METHOD AND APPARATUS FOR GENERATING REED-SOLOMAN ERROR CORRECTING CODE ACROSS MULTIPLE WORD BOUNDARIES

The present invention relates to disk array storage devices and, more particularly, to an improved means for generating error correction code within such disk array storage device.

BACKGROUND OF THE INVENTION

A continuing problem in data storage systems is the detection and correction of data errors within the storage systems. One general method for detecting single bit errors within a data word is a parity bit check. A parity bit is an extra bit included with a data word to make the number of 1's in the word (including the parity bit) either odd or even. A bit error in the word is detected by recalculating its parity and comparing the newly determined parity with the parity bit transmitted or saved with the word. An error exists if the new parity does not correspond with previously determined parity. Parity check bit schemes are limited to detecting single bit errors.

To detect multiple bit errors and correct detected errors numerous, sophisticated, Error Correction Codes (ECC) systems have been developed. One well known ECC scheme for use in disk storage systems is identified as the Reed-Solomon Cyclic Redundancy Check (R-S CRC) method. This scheme generates an error code for each data block saved to the disk storage system. Generation of Reed-Solomon ECC codes, detection of errors and the correction of detected errors may be performed by the host system CPU, thereby consuming valuable host CPU time, or by special logic external to the host. Unfortunately, most methods for generating Reed-Solomon ECC codes external to the host generate error codes in a word-serial manner, i.e. the data words within the data block being transferred to or read from must be sequentially processed through the ECC logic, thereby slowing down the rate at which data may be transferred. This word-serial manner of generating ECC codes further complicates multiple-word parallel transfers such as occur in high bandwidth disk array storage systems.

OBJECTS OF THE INVENTION

It is therefore an object of the present invention to provide a new and useful error correction code generation circuitry not subject to the limitations of the prior art discussed above.

It is another object of the present invention to provide such an error correction code generation circuit which generates error correction codes for multiple-word parallel transfers rather than single word transfers.

It is yet another object of the present invention to provide a new and useful error correction code generation circuitry for use in RAID storage systems.

It is still a further object of the present invention a new and useful error correction code generation circuitry which can be configured to generate error correction codes by processing data words in either a serial or parallel manner.

SUMMARY OF THE INVENTION

There is provided, in accordance with the present invention, an error correction code (ECC) generator/checker for processing high bandwidth data block transfers, i.e. data block transfers comprises a series of multiple-word parallel data transfers. The high bandwidth ECC generator/checker logic includes a plurality single-word ECC generator/checker circuits for processing single-word transfers; a single-word ECC generator/checker circuit corresponding to each word in the multiple-word parallel transfers. Each single-word ECC generator/checker circuit includes a first input for receiving its corresponding data word from the multiple-word parallel transfer, a second input for receiving the ECC word generated by the previous ECC generator/checker, means for combining the data words received at the first and second inputs, an alpha multiplier and an output for providing an ECC word.

The single-word ECC circuits are connected together in series such that the first-word ECC circuit, i.e. the single-word ECC circuit corresponding to the first word within the multiple-word parallel transfers, is connected to the second input of the second-word ECC circuit; the output of the second-word ECC circuit is connected to the second input of the third-word ECC circuit, and so on. The output of the last-word ECC circuit is fed back to the second input of the first word ECC circuit. Thus, an error correction code is generated for all words in a high bandwidth transfer in parallel. An intermediate ECC code word is first generated by the first-word ECC generator/checker circuit which ripples up through the remaining series-connected single-word ECC circuits and is fed back to the first-word ECC circuit.

In the described embodiment, the high bandwidth ECC generator/checker logic includes four stages, each stage including Reed-Solomon Cyclic Redundancy Check (RS CRC) code logic for processing a single sixteen-bit data word. The stages can be configured to operate in parallel to process four-word parallel (sixty-four bit) high bandwidth transfers, or individually wherein each stage processes data in a word-serial manner. Each stage includes first and second inputs, combining means, an alpha multiplier and an output as described above. When configured to operate in high bandwidth mode the output of the first, second and third stages are connected to the second inputs of the second, third and fourth stages, respectively. The output of stage four is fed back to the second input of the first stage. When configured to operate in a word-serial manner, the output of a selected stage is fed back to its second input.

The above and other objects, features, and advantages of the present invention will become apparent from the following detailed specification when read in conjunction with the accompanying drawings in which applicable reference numerals have been carried forward.

DETAILED DESCRIPTION OF THE PREFERRED EMBODIMENT

Figure 1A:
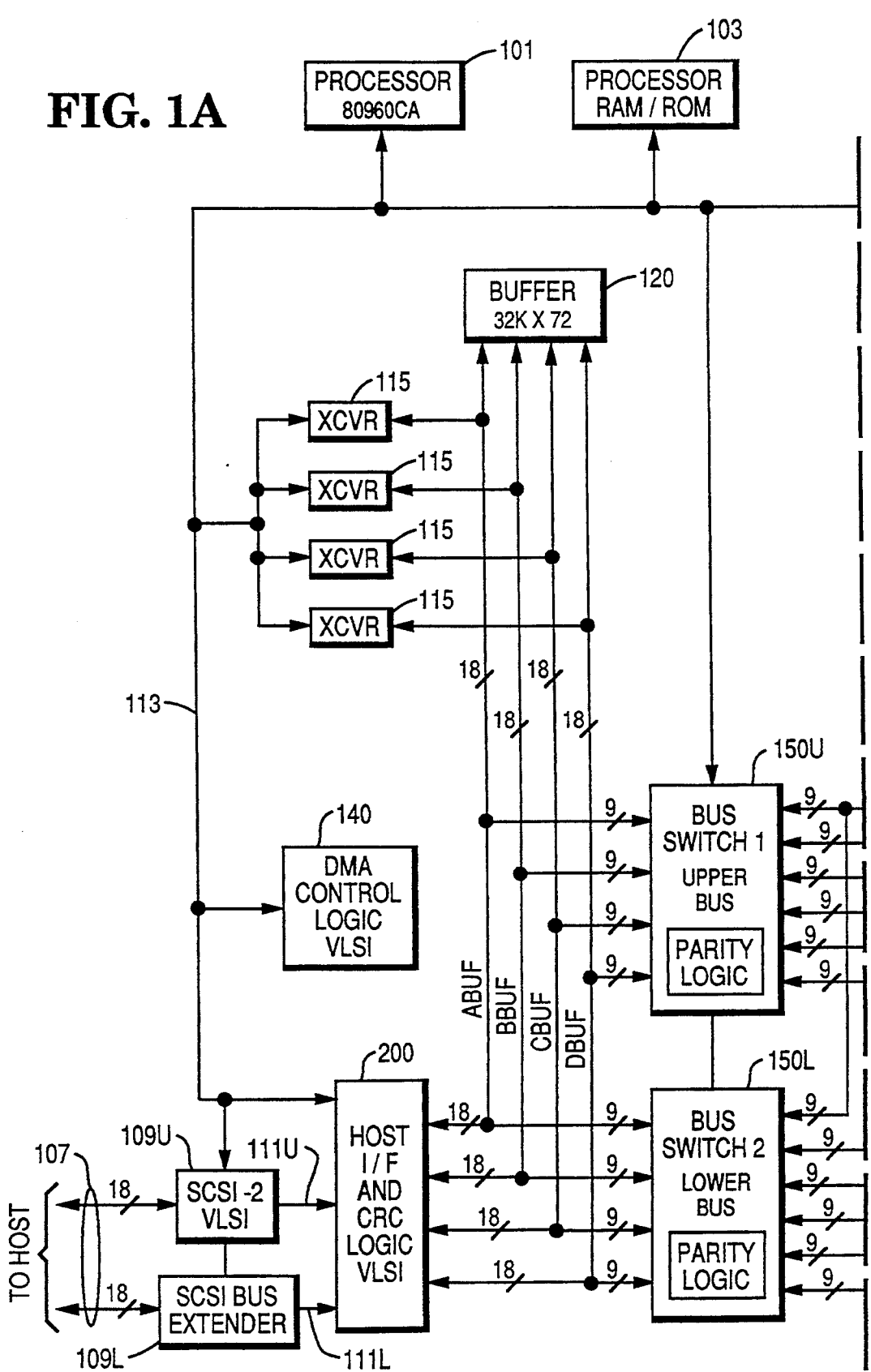
FIGS. 1A and 1B illustrate in block diagram form the architecture for a disk array/controller employing the Reed-Solomon ECC logic of the present invention.
Figure 1B:
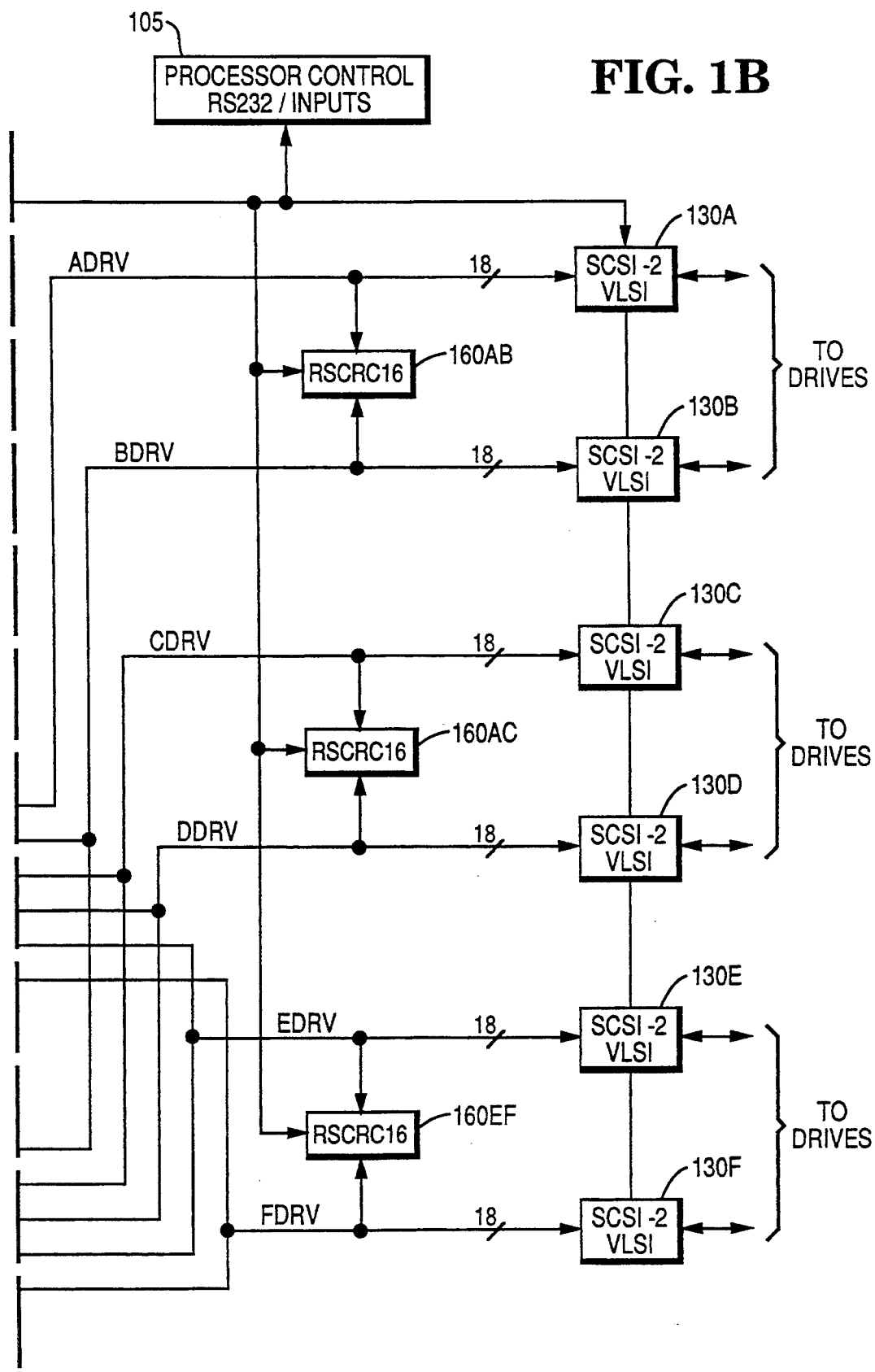

Referring now to FIGS. 1A and 1B, the architecture of a disk array controller including Reed-Solomon ECC logic is shown in block diagram form. The controller exchanges data with the host computer system (not shown) through Host Interface and CRC Logic block 200. Host I/F Logic block 200, under the control of processor 101, interfaces an external 18-bit or 36-bit wide, SCSI-2 bus 107 associated with the host system with four internal 18-bit wide buffer busses ABUF, BBUF, CBUF and DBUF. Bus 107 connects to Host I/F Logic block 200 through a standard SCSI-2 chip set, represented by blocks 109U and 109L and eighteen-bit busses 111U and 111L. Interconnection between block 200 and processor 101 is provided by address-/data bus 113. The internal construction and operation of block 200 will be described in greater detail below with reference to FIGS. 2A and 2B.

Internal buffer busses ABUF, BBUF, CBUF and DBUF connect Host I/F Logic block 200 with a RAM buffer 120 and upper and lower byte bus switches 150U and 150L. Buffer 120 possesses the capability to read and write 72-bit wide words from the four buffer busses, or individual 18-bit wide words from any one of the buffer busses. Eighteen or 36-bit access is also provided through transceivers 115 to bus 113.

Bus switches 150U and 150L provides variable bus mapping between buffer busses ABUF, BBUF, CBUF and DBUF and six 18-bit wide drive busses labeled ADRV, BDRV, CDRV, DDRV, EDRV and FDRV, each switch providing routing for one byte (eight bits data and one bit parity) of information. Bus switches 150U and 150L further include the capability to generate parity information, which may be directed onto any of the buffer or drive busses, check parity information and reconstruct information stored on a failed disk drive.

Each one of drive busses ADRV, BDRV, CDRV, DDRV, EDRV and FDRV is connected to an associated SCSI-2 device, labeled 130A through 130F, which provide connection to six corresponding disk drives (not shown) forming the disk array. The six drives will be identified herein as drives A through F. Reed-Solomon Cyclic Redundancy Check (RSCRC) logic blocks 160AB, 160CD and 160EF are connected between busses ADRV and BDRV, CDRV and DDRV, and EDRV and FDRV, respectively, to provide error detection and generation of Reed-Solomon CRC for the array controller.

The control of Host I/F Logic block 200; bus switches 150U and 150L; RSCRC logic blocks 160AB, 160CD and 160EF; and SCSI devices 109U, 109L, and 130A through 130F is provided by microprocessor 101. Communication between microprocessor 101, associated processor memory 103 and processor control inputs 105 and the above-identified elements is provided by address/data bus 113.

Also shown connected to bus 113 is DMA Control Logic block 140. The logic within block 140 provides DMA and buffer control for the Host I/F Logic block 200, bus switches 150U and 150L, SCSI-2 devices 130A through 130F and processor 101. The DMA Control Logic block communicates with microprocessor 101 as a peripheral device. It is controlled by reading and writing internal registers. The logic supports the following types of data transfers: host read (buffer 120 data sent to SCSI host), host write (data received from host written into buffer-120), target read (data read from drive array written into buffer 120), target write (buffer 120 data written to drive array), direct write (data received from SCSI host sent to drive array with no buffering), direct read (data read from drive array sent to SCSI host without buffering), processor read and processor write.

Descriptions of the logic included within, and operation of, Host I/F Logic block 200, now follows.

Figure 2A:
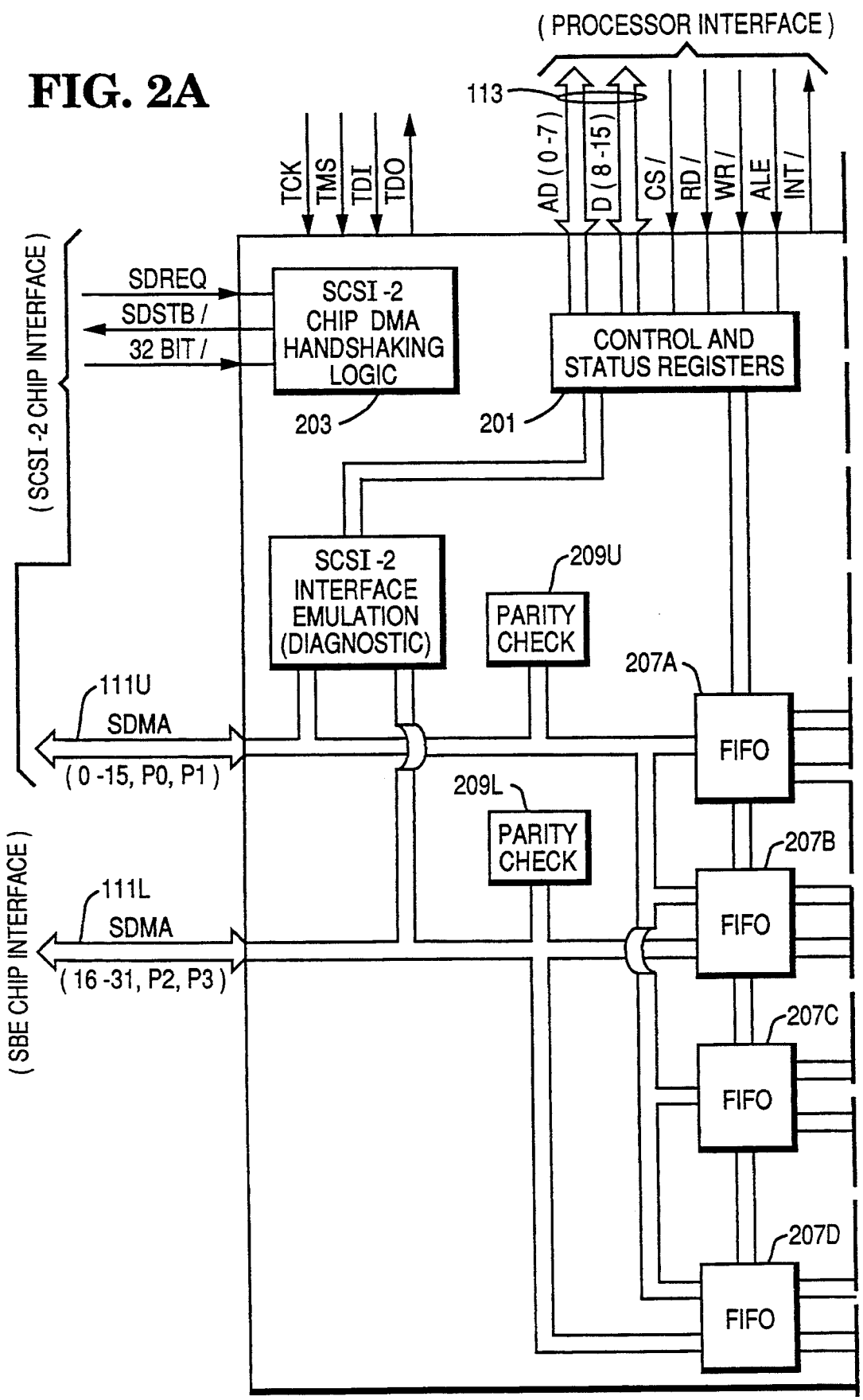
FIGS. 2A and 2B together provide a block diagram illustration of the logic included within Host Interface and CRC Logic block 200 shown in FIGS. 1A and 1B.
Figure 2B:
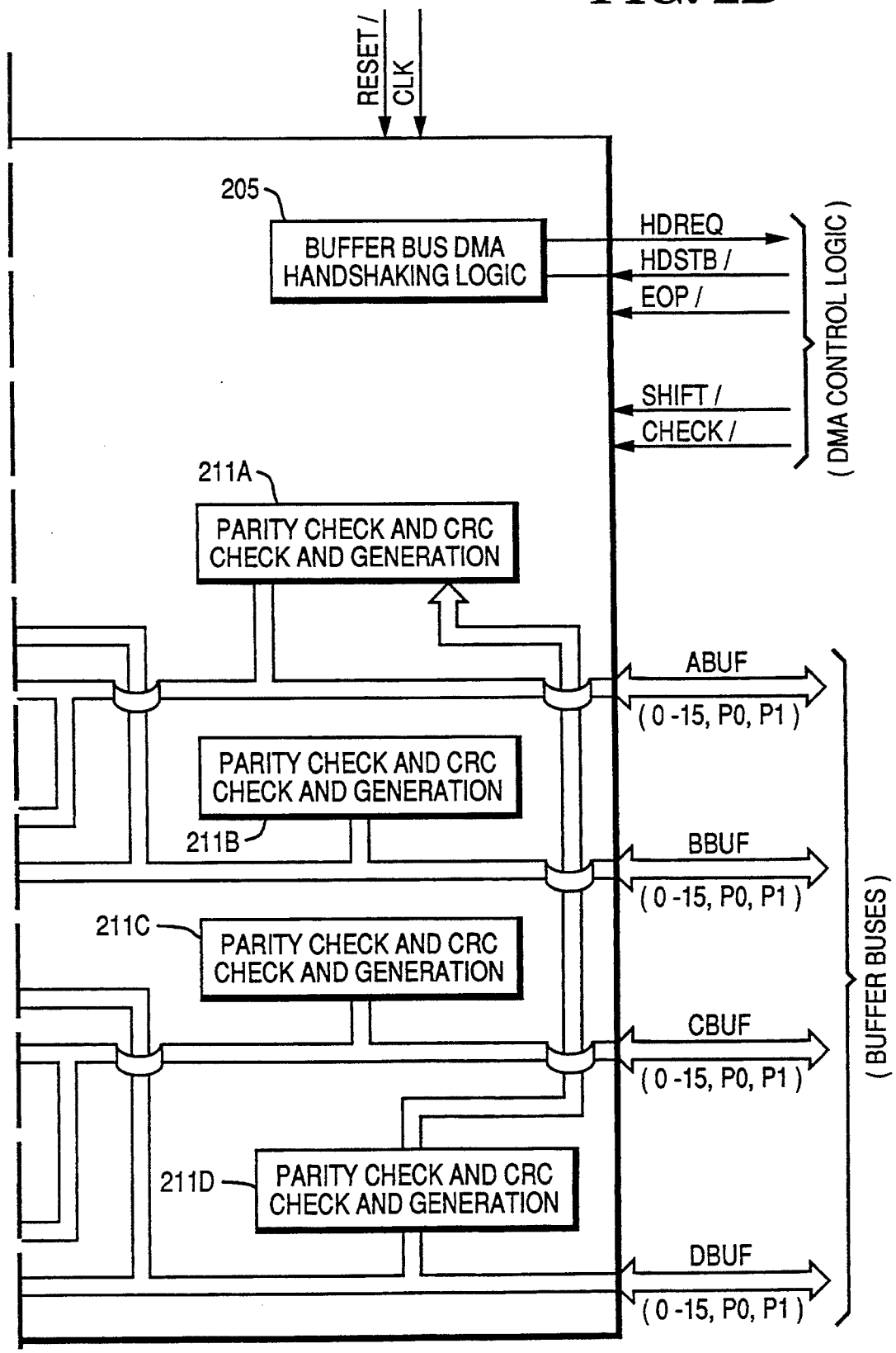

FIGS. 2A and 2B together provide a block diagram illustration of the logic included within Host I/F Logic block 200 shown in FIG. 1. The Host I/F Logic block includes six major types of internal logic blocks: control and status registers 201, SCSI-2 DMA bus handshaking logic 203, buffer bus DMA handshaking logic 205, FIFO blocks 207A through 207D, parity check blocks 209U and 209L, and parity check and cyclic redundancy check (CRC) generation blocks 211A through 211D.

Control and status register block 201 contains several 16-bit control registers utilized to configure, control and reset the functions of Host I/F Logic block 200. Block 201 also includes status registers used by controller microprocessor 101 to determine the state of the Host I/F Logic block. Microprocessor access to the control and status registers within block 201 is provided by multiplexed address/data bus AD(0–7), data bus D(8–15), and various control lines for transmitting chip select signal CS/, read signal RD/, write signal WR/, address latch enable signal ALE and interrupt signal INT/. Busses AD(0–7) and D(8–15) are included within address/data bus 113, shown in FIGS. 1A and 1B.

Block 203 contains the SCSI-2 DMA bus handshaking logic necessary to effectuate DMA transfers between Host I/F Logic block 200 and SCSI-2 device 109U. The handshaking logic also controls the multiplexing and demultiplexing of data between SCSI devices 109U and 109L and FIFOs 207A through 207D. Block 203 also modulates request/acknowledge handshaking depending upon the empty or full status of the FIFOs. Buffer bus DMA handshaking logic 205 contains similar handshaking logic for controlling DMA transfers between the Host I/F Logic block and an external buffer bus controller.

The four FIFO blocks 207A through 207D are utilized to eliminate any handshaking dependencies between the Host I/F Logic block and buffer busses ABUF, BBUF, CBUF and DBUF. FIFO blocks 207A and 207B are each connected between bus 111U and buffer busses ABUF and BBUF. FIFO blocks 207C and 207D are each connected between bus 111U and buffer busses CBUF and DBUF. If the controller architecture includes SCSI bus extender device 109L and associated bus 111L, blocks 207B and 207D are also connected to bus 111L. The configuration and operation of the FIFO blocks are controlled by registers within block 201. Each FIFO block can store up to four eighteen bit words (sixteen bits of data and two bits of parity).

Blocks 209U and 209L provide parity check for all information transmitted between the Host I/F Logic block and SCSI-2 devices 109U and 109L, respectively. These blocks generate parity information for the data transfers and compare the generated parity information with the parity information transmitted with the data.

Blocks 211A through 211D provide a parity check for data transfers between the Host I/F Logic block and respective buffer busses. Blocks 211A through 211D also function to generate and append CRC data to DMA data blocks, and to check and remove appended CRC data from DMA data blocks.

In operation Host I/F Logic block 200 is used to multiplex data between SCSI-2 devices 109U and 109L and the four buffer busses ABUF, BBUF, CBUF and DBUF. Block 200 provides multiplexing functionality between busses 111U and 111L and (1) all four buffer busses for 4+1 RAID level 3 and high bandwidth RAID level 5 applications by word stripping data across the four buffer busses in a rotating sequential order, (2) one of two defined pairs of buffer busses for 2+1 RAID level 3 applications by word stripping data across the pair of buffer busses in a rotating sequential order, of (3) any one of the buffer busses for RAID level 1 and single bus RAID level 5 applications.

Figure 3:
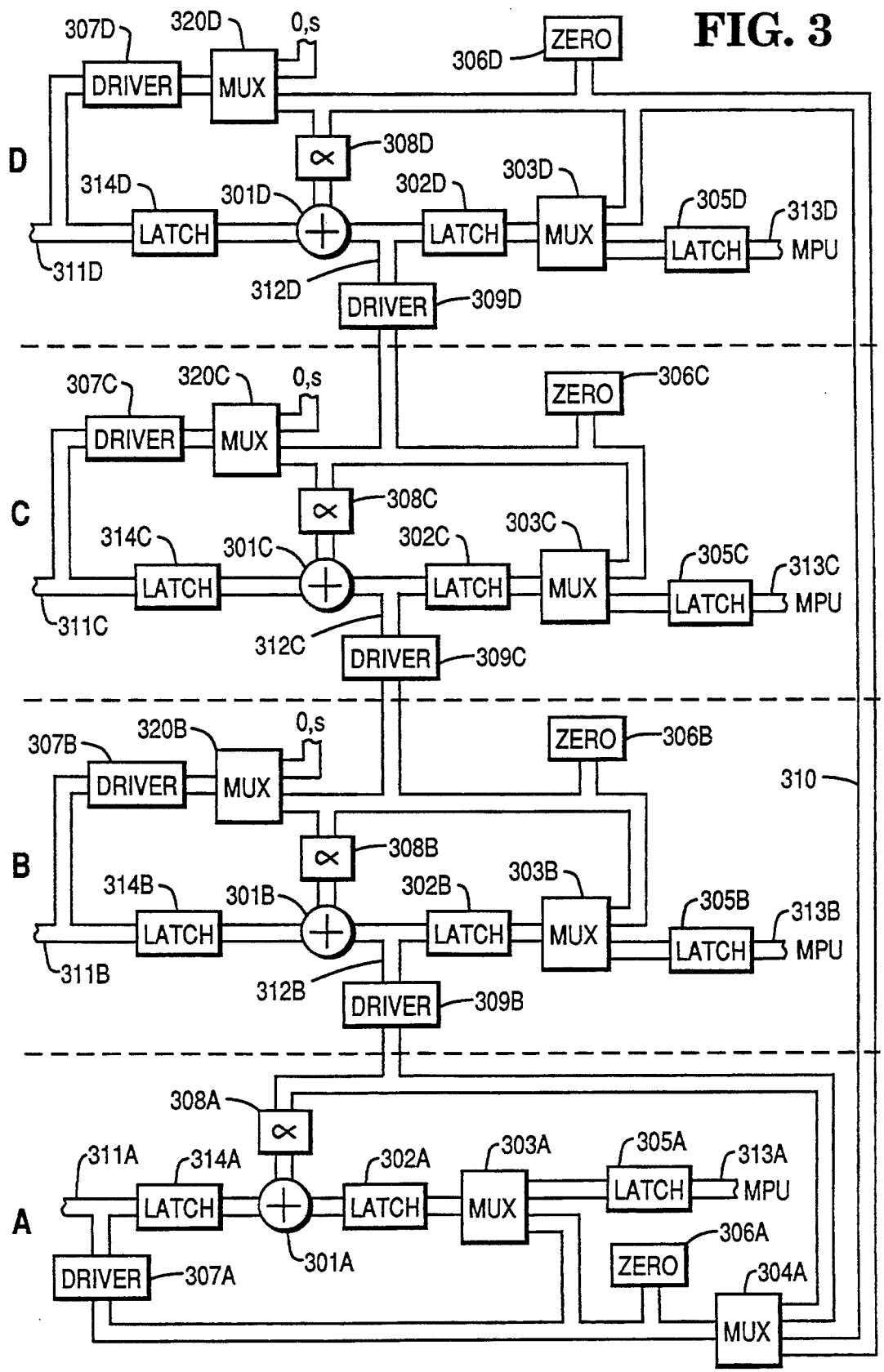
FIG. 3 is logic block diagram representation of the Reed-Solomon ECC logic included within Host Interface and CRC Logic block 200 for generating ECC across multiple word parallel transfers in accordance with a preferred embodiment of the present invention.
Figure 4:
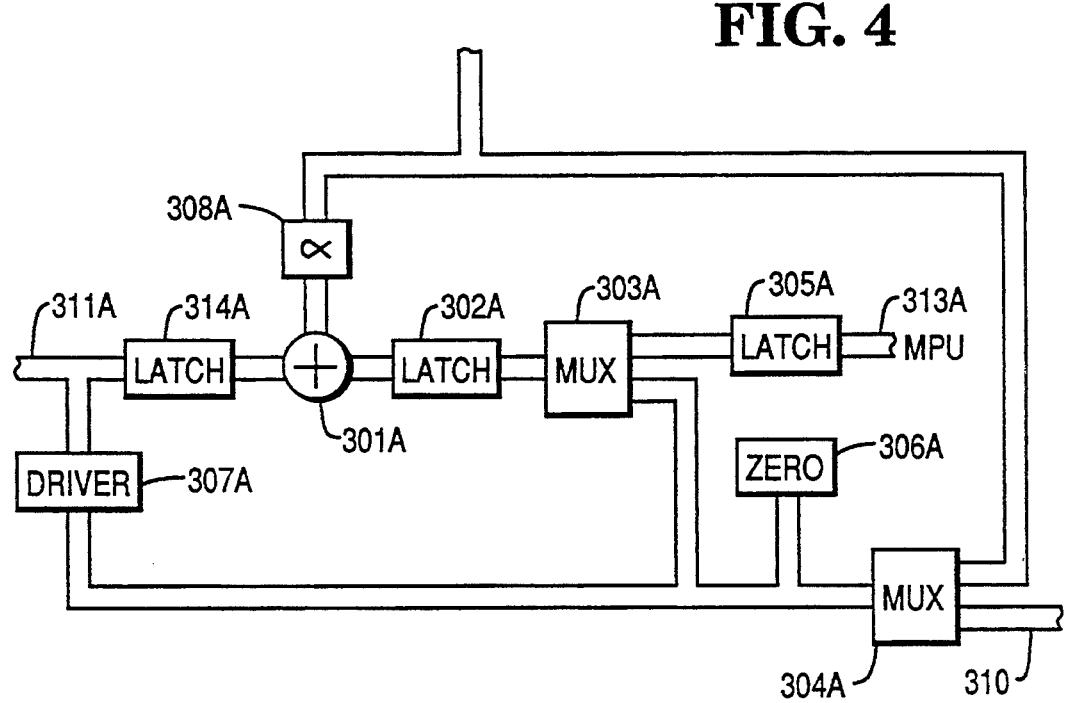
FIG. 4 is a logic block diagram illustration of stage "A" of the ECC logic shown in FIG. 3.
Figure 5:
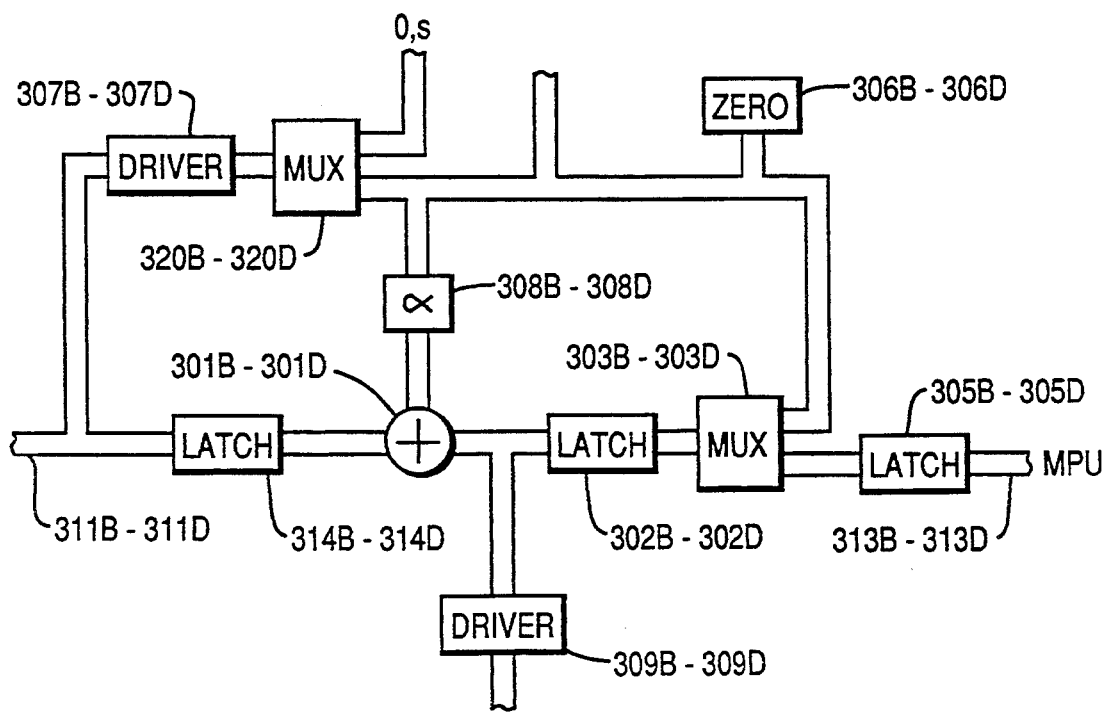
FIG. 5 is a logic block diagram illustration of stages "B" through "D" of the ECC logic shown in FIG. 3.

The logic included within blocks 211A through 211D for generating CRC, or ECC, data is shown in block diagram form in FIGS. 3 through 5. Referring to FIG. 3, the ECC generation logic is seen to include four stages identified by reference numerals A through D and corresponding to the four CRC blocks 211A through 211D, respectively, shown in FIG. 2B. Each stage is connected to a respective one of bi-directional data busses ABUF through DBUF. Corresponding elements included within stages A through D are identified by the same reference numerals, but with different suffixes appended thereto for identifying the stage which includes the element. For example, each of stages A through D includes an exclusive-OR circuit, discussed below, identified by reference numerals 301A, 301B, 301C and 301D, respectively.

The principal elements within the stage A logic circuit of FIG. 4 include an exclusive-OR circuit 301A connected to receive data from a data-in latch 314A, containing data received from the bi-directional data bus 311A (ABUF in FIGS. 1 and 2), and accumulator latch 302A. Accumulator latch 302A may be loaded with either seed data provided by the controller microprocessor, feedback data obtained from an alpha multiplier 308A, or feedback data obtained from stage D. The output of exclusive-OR circuit 301A forms the input to alpha multiplier 308A.

The basic construction of stages B through D of the ECC generation logic is shown in the logic diagram of FIG. 5. Each one of stages B through D is constructed as shown. The individual elements within the circuit shown are labeled by a reference numeral followed by "B–D" to specify the stages which include the element. The principal elements within stages B through D include an exclusive-OR circuit 301B–D connected to receive data from a data-in latch 314B–D, containing data received from the bi-directional data bus 311B–D (BBUF, CBUF and DBUF in FIGS. 1 and 2), and either an accumulator latch 302B–D or the output of the prior stage. Accumulator latch 302B–D may be loaded with either seed data provided by the controller microprocessor or feedback data obtained from an alpha multiplier 308B–D The output of exclusive-OR circuit 301A forms the input to alpha multiplier 308B–D.

A description of each of the elements shown in FIGS. 4 and 5 now follows.

Exclusive-OR Circuit 301A–D: This circuit combines sixteen-bit data words received from data-in latch 314A–D and either ECC accumulator latch 302A–D or stage driver 309B–D in a bit-wise exclusive-OR operation. In stage A this is a logical XOR of data received from data bus 311A (ABUF) and the output of ECC accumulator latch 302A. In stages B through D this is a logical XOR of data received from data bus 311B–D and either the output of ECC accumulator latch 302B–D or incoming data from the previous stage via driver 309B–D, whichever is selected.

ECC Accumulator Latch 302A–D: This clocked, tri-state, register stores the intermediate ECC calculation during each data transfer cycle. At the end of the first cycle of any block transfer this latch is initialized by loading it with a predefined seed value received from MPU seed latch 305A–D. ECC accumulator latches 302B through 302D are enabled when the ECC logic is configured to generate ECC for word-serial transfers. ECC accumulator latches 302B through 302D are placed in a tri-state state when the ECC logic is configured to generate ECC for multiple word parallel transfers, thus allowing prior stage output to be fed to exclusive-OR circuit 301B–D.

Feedback Data Path Selector 303A–D: This multiplexer is used to select the data which is fed into the ECC accumulator latch. For stage A the data may be from MPU seed latch 305A or feedback data path selector 304A. For stages B through D the data may be from MPU seed latch 305B–D or alpha multiplier 308B–D.

Feedback Data Path Selector 304A: This multiplexer is used to configure the feedback data path for stage A. Feedback data is selected from either alpha multiplier 308A or stage D alpha multiplier 308D MPU Seed Latch 305A–D: The MPU seed latch is preloaded with a seed value provided by the MPU. The seed value is selected to create specific ECC characteristics.

Zero Detect Logic 306A–D: Utilized during CRC check cycles, the zero detect logic detects a zero output from alpha multiplier 308A–D. In the check mode of operation this zero state indicates the absence of an error.

Output Driver 307A–D: This buffer is used to drive the calculated ECC data word onto bi-directional data bus 311A–D. The output driver is enabled during the last transfer of a generate cycle.

Alpha Multiplier 308A–D: The alpha multiplier is a set of asynchronous logic for performing an arithmetic multiplication of incoming data and a predefined fixed number.

Stage Driver 309B–D: This tri-state buffer is used to provide output received from the prior stage alpha multiplier 308A–C to exclusive-OR circuit 301B–D when the ECC logic is configured to generate ECC for multiple word parallel transfers. Stage driver 309B–D is placed in a tri-state mode when the ECC logic is configured to generate ECC for word-serial transfers.

Word Wide Bi-Directional Data Bus 311A–D: This bus, also identified in FIGS. 1 and 2 as bus ABUF–D-

BUF, is the source of transfer data during CRC check operations and during all but the last transfer of ECC generate cycles. ECC data is driven unto the data bus during the last transfer of a generate cycle.

MPU Data Path 313A-D: This bus is the source of seed data for MPU seed latch 305A-D.

Data-In Latch 314A-D: This register is used to latch incoming data at the input of exclusive-OR circuit 301A-D to ensure data hold time.

Output Selector 320B-D: This multiplexer is used to select output data, normally the output of alpha multiplier 308B-D, provided to output driver 307B-D.

Stages A through D are configured to operate together to process four-word parallel transfers or independently to process serial word transfers by the operation of multiplexers 303A-D, multiplexer 304A latches 302A-D and stage drivers 309B-D. Drivers 309B-D are enabled, latches 302B-D are placed in a tri-state mode, and multiplexers 304A and 303A are set to route the output of stage D to latch 302A to establish the data paths between the stages for multiple-word parallel transfers. Drivers 309B-D are placed in a tri-state mode, latches 302A-D are enabled, and multiplexers 304A and 303A-D are set to establish feed back data paths within each stage to process word-serial transfers.

Figure 6:
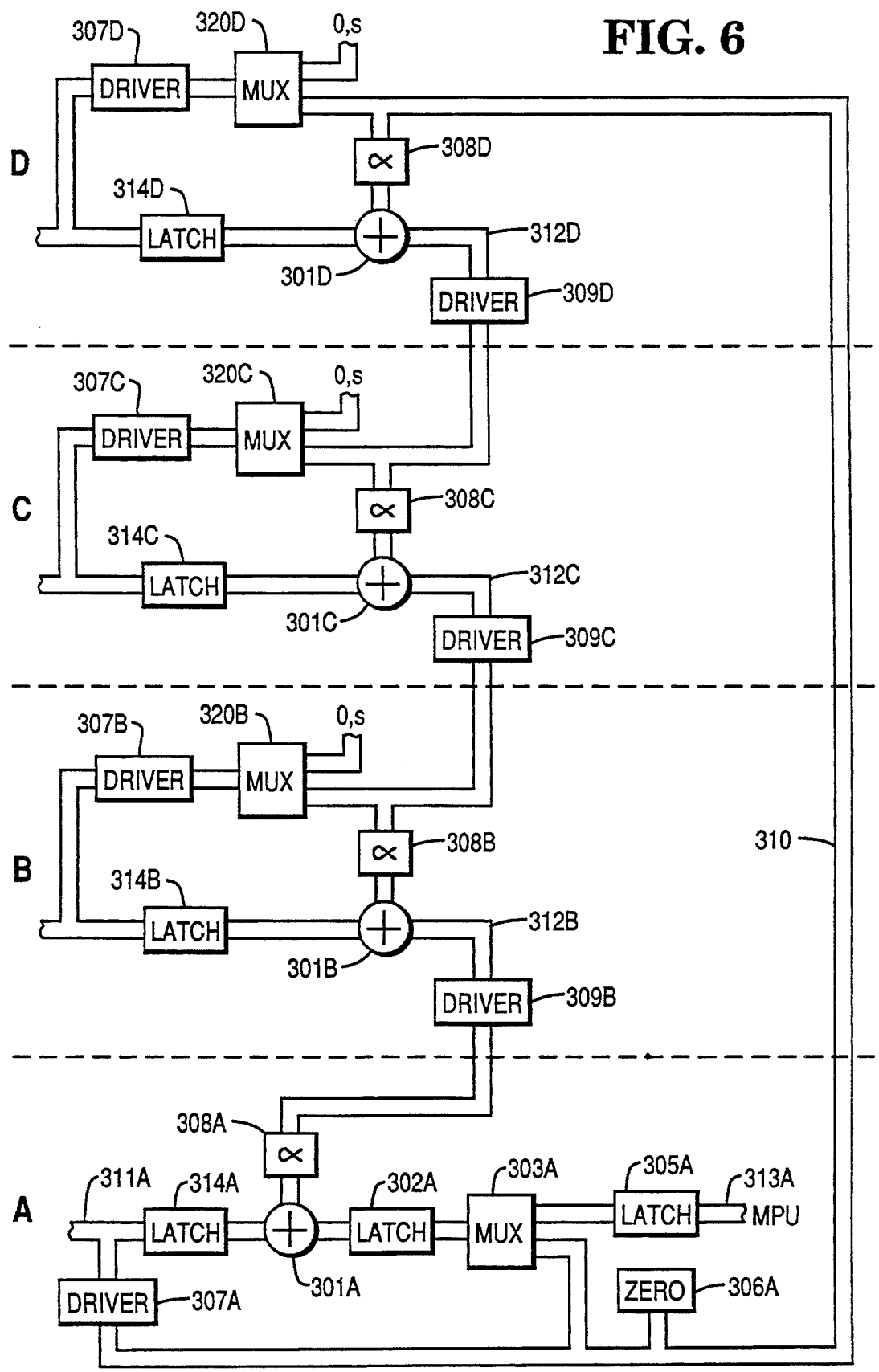
FIG. 6 is a logic block diagram of the Reed-Solomon ECC logic of the present invention configured to generate ECC for a multiple word parallel transfer. Logic that is inactive during this manner of operation is omitted for simplicity.

Operation of the ECC logic discussed above will now be explained with reference to FIGS. 6 and 7. FIG. 6 is a logic block diagram of the Reed-Solomon ECC logic configured to generate ECC for a multiple word parallel transfer, i.e., for high bandwidth operation. Logic that is inactive during this manner of operation is omitted to simplify the understanding of the invention. Step-by-step explanations of the high bandwidth ECC generation and checking operations now follow.

High Bandwidth ECC Generation

During high bandwidth operation, ECC is calculated over all four data buses, 311A-D (ABUF through DBUF), in parallel. ECC word calculation begins in stage A, ripples up through stages B, C and D, and is then fed back to stage A. A step-by-step explanation of the high bandwidth operation follows.

1. Seed data is loaded into MPU seed latch 305A from MPU data bus 313A.
2. Input data is presented on data busses 311A through 311D.
3. The input data is latched into corresponding data-in latches 314A through 314D and stage A seed data is latched into ECC accumulator latch 302A.
4. Data from latch 302A is exclusive-ORed with stage A input data from latch 314A and multiplied by alpha.
5. The calculated stage A ECC data from alpha multiplier 308A is provided to stage B. Within stage B, ECC data received from stage A is exclusive-ORed with stage B input data from latch 314B and multiplied by alpha.
6. The calculated stage B ECC data from alpha multiplier 308B is provided to stage C. Within stage C, ECC data received from stage B is exclusive-ORed with stage C input data from latch 314C and multiplied by alpha.
7. The calculated stage C ECC data from alpha multiplier 308C is provided to stage D. Within stage D, ECC data received from stage C is exclusive-ORed with stage D input data from latch 314D and multiplied by alpha.
8. The calculated stage D ECC data from alpha multiplier 308D is fed back to stage A via feedback data path 310.
9. New input data is presented on data busses 311A through 311D.
10. The new input data is latched into corresponding data-in latches 314A through 314D and stage D ECC data from feedback data path 310 is latched into ECC accumulator latch 302A.
11. Process steps 4 through 10 are repeated until data transfer on data buses 311A through 311D has been completed.
12. Concurrent with the last data transfer, the calculated ECC word is appended to the end of the data transfer. The final ECC word is driven from the stage D output via feedback data path 310 onto data bus 311A through driver 307A. Output select multiplexers 320B through 320D are set to drive zero data onto busses 311B through 311D.

High Bandwidth ECC Check Operation

During ECC check operations, the input data presented on data busses 311A through 311D includes ECC data appended thereto, the last data transfer being the appended ECC data. Operation of the ECC logic during high bandwidth checking operations proceeds as described for high bandwidth ECC generation in steps 1 through 11 above. Step 12, however, is replaced with the step of checking the final ECC output for an all zero condition, indicating that no error was found by zero detect logic 306A.

Figure 7:
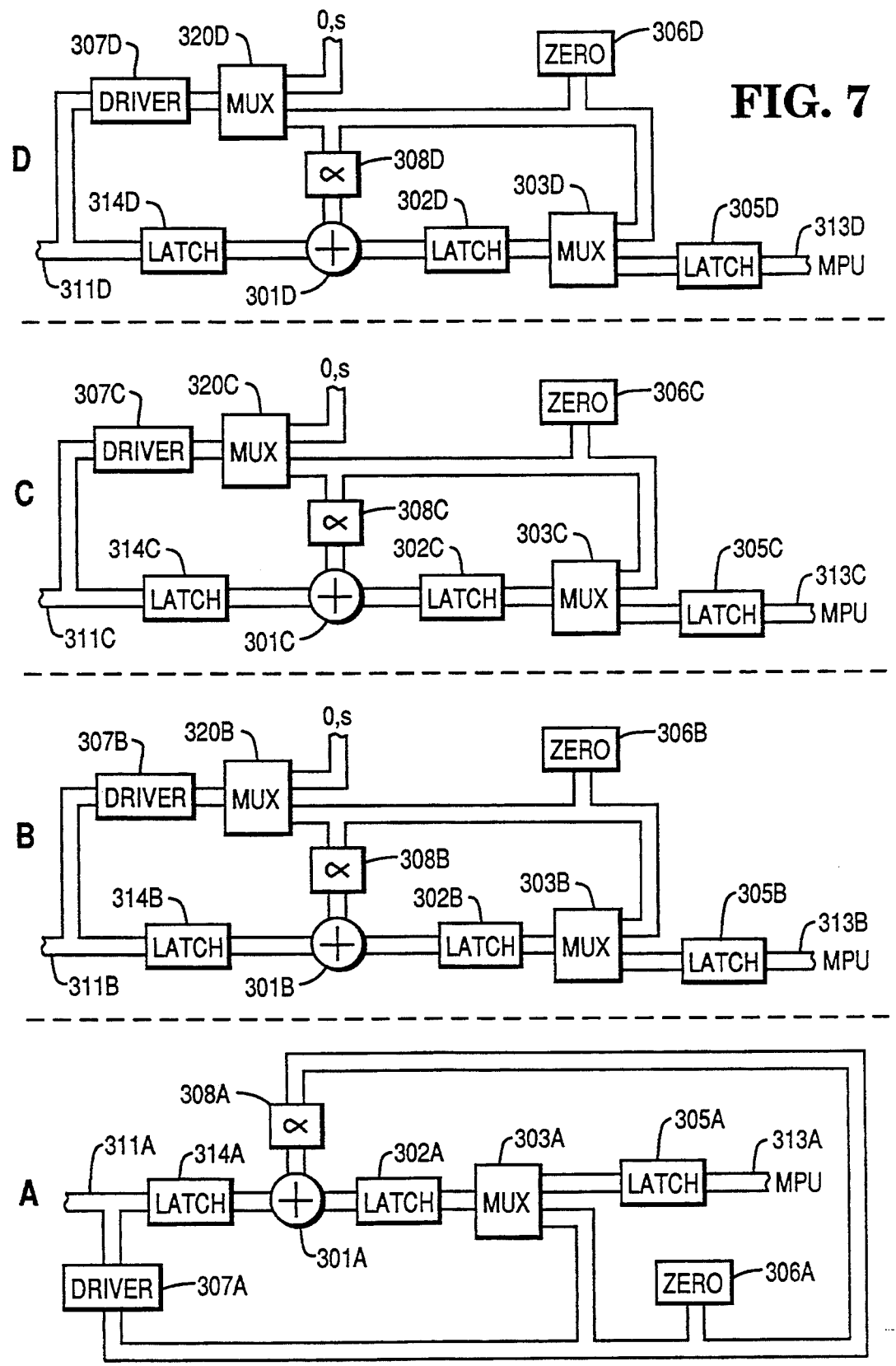
FIG. 7 is a logic block diagram of the Reed-Solomon ECC logic of the present invention configured to generate ECC for serial word transfers. Logic that is inactive during this manner of operation is not shown for simplicity.

FIG. 7 is a logic block diagram of the Reed-Solomon ECC logic of the present invention configured to generate ECC for serial word transfers. Logic that is inactive during this manner of operation is not shown for simplicity. Step-by-step explanations of the word serial ECC generation and checking operations for stage A are provided below. Stages B through D operate in the same manner as described below for stage A Serial Word Transfer ECC Generation 1. Seed data is loaded into seed latch 305 from MPU data bus 313.
2. Input data appearing on data bus 311 is latched into data-in latch 314 and seed data is latched into ECC accumulator latch 302.
3. The data in latch 312 is exclusive-ORed (XORed) with the data in latch 314 and the result provided to alpha multiplier 308.
4. Alpha multiplier 308 contains a set of asynchronous logic that performs an arithmetic multiplication of the incoming data by a predefined fixed number.
5. The output of alpha multiplier 308 is latched into ECC accumulator latch 302.
6. The process of steps 2 through 5 is repeated until data transfer on data bus 311 has been completed.
7. The last value latched into ECC accumulator latch 302 is provided via transceiver 307 to data bus 311 for storage with the transferred data.

Serial Word Transfer ECC Check Operation

Operation of the ECC logic during high bandwidth checking operations proceeds as described for serial word ECC generation in steps 1 through 6 above. Step 7, however, is replaced with the step of checking the final output of alpha multiplier 308 for an all zero condition indicating that no error is detected. Logic 306 performs the zero detect operation.

It can thus be seen that there has been provided by the present invention an ECC generation and check circuit which generates error correction codes and performs error checking for high bandwidth, multiple-word, parallel transfers. In addition the circuit can be configured to perform word serial ECC generation and checking functions. The circuitry described above is shown incorporated within a disk array controller for generating and checking ECC during array write and read operations, respectively.

Although the presently preferred embodiment of the invention has been described, it will be understood that various changes may be made within the scope of the appended claims.

What is claimed is:

1. In a data storage system, apparatus for generating a Reed-Solomon Cyclic Redundancy Check error correction code (ECC) during a data block transfer, said data block transfer comprising a series of multiple-word parallel data transfers, each multiple-word parallel transfer comprising N words., said error correction code to be appended to said data block, said apparatus comprising:

a plurality of ECC generation circuits; an ECC generation circuit corresponding to each of the N words in said multiple-word parallel transfers; each ECC circuit including a first input for receiving its corresponding data word from said multiple-word parallel transfers, a second input for receiving a data word, and an output for providing an ECC word;

each one of said ECC circuits comprising an exclusive-OR circuit connected to said first and second inputs for combining the data words received at said first and second inputs; and an alpha multiplier connected to receive the word generated by said exclusive-OR circuit for performing an arithmetic multiplication of the word generated by said exclusive-OR circuit and a predefined fixed variable, the product generated by said alpha multiplier being provided to the output of said ECC circuit;

each one of said ECC generation circuits corresponding to data words 2 through N−1 within said multiple-word parallel transfers having its second input connected to the output of the ECC circuit corresponding to the preceding data word within said multiple-word parallel transfers; and the ECC generation circuit corresponding to data word 1 within said multiple-word parallel transfers having its second input connected to the output of the ECC circuit corresponding data word N within said multiple-word parallel transfers.

2. The apparatus according to claim 1, wherein each one of said ECC circuits further includes:

zero detect logic connected to receive the product generated by said alpha multiplier, said zero detect logic generating a signal upon the conclusion of a data block transfer including appended EEC code data indicating the presence of errors within the transferred data block.

3. The apparatus according to claim 1, wherein each one of said ECC circuits includes:

a data path selector connected to receive data words from said one of said ECC circuits' second input and said one of said ECC circuits' output for conveying a selected one of said received data words to said one of said ECC circuit' exclusive-OR circuit; and whereby said ECC circuit generates ECC code words for multiple-word transfers when said data path selector connects said one of said ECC circuits' second input with said exclusive-OR circuit and generates ECC code words in a word serial manner when said data path selector connects said one of said ECC circuits' output with said exclusive-OR circuit.

4. In a data storage system, apparatus for generating an error correction code (ECC) during a data block transfer, said data block transfer comprising a series of multiple-word parallel data transfers, said apparatus comprising:

an exclusive-OR (XOR) circuit corresponding to each data word within said multiple-word parallel transfers, said XOR circuit having a first input for receiving its corresponding data word and a second input, said XOR circuit for combining its corresponding data word with a data word received at its second input;

an alpha multiplier corresponding to each one of said XOR circuits, said alpha multiplier being connected to receive the word generated by its corresponding XOR circuit for performing an arithmetic multiplication of the word generated by its corresponding XOR circuit and a predefined fixed variable; and a data path selector corresponding to each one of said alpha multipliers, said data path selector having a first input connected to receive the product generated by its corresponding alpha multiplier, a second input, and an output connected to the second input of its corresponding XOR circuit;

each one of said data path selectors corresponding to data words subsequent to the first data word within said multiple-word parallel transfers having its second input connected to receive the product generated by the alpha multiplier corresponding to the preceding data word within said multiple-word parallel transfers; and the data path selector corresponding to the first data word within said multiple-word parallel transfers having its second input connected to receive the product generated by the alpha multiplier corresponding to the last data word within said multiple-word parallel transfers.

5. The apparatus according to claim 4, further comprising:

zero detect logic corresponding to each one of said alpha multipliers and connected to receive the product generated by said alpha multiplier, said zero detect logic generating a signal upon the conclusion of a data block transfer including appended EEC code data indicating the presence of errors within said the transferred data block.

6. In a data storage system, apparatus for generating an error correction code (ECC) during a data block transfer; said data block transfer comprising a series of four-word parallel data transfers, each parallel transfer including a first, second, third and fourth data word; said apparatus comprising:

a first exclusive-OR (XOR) circuit having a first input for receiving said first data word and a second input, said first XOR circuit for combining said first data word with a data word received at its second input;

a first alpha multiplier connected to receive the word generated by said first XOR circuit for performing an arithmetic multiplication of the word generated by said first XOR circuit and a predefined fixed variable;

a second exclusive-OR (XOR) circuit having a first input for receiving said second data word and a second input connected to receive the product generated by said first alpha multiplier, said second XOR circuit for combining said second data word with the product generated by said first alpha multiplier;

a second alpha multiplier connected to receive the word generated by said second XOR circuit for performing an arithmetic multiplication of the word generated by said second XOR circuit and a predefined fixed variable;

a third exclusive-OR (XOR) circuit having a first input for receiving said third data word and a second input connected to receive the product generated by said second alpha multiplier, said third XOR circuit for combining said third data word with the product generated by said second alpha multiplier;

a third alpha multiplier connected to receive the word generated by said third XOR circuit for performing an arithmetic multiplication of the word generated by said third XOR circuit and a predefined fixed variable;

a fourth exclusive-OR (XOR) circuit having a first input for receiving said fourth data word and a second input connected to receive the product generated by said third alpha multiplier, said fourth XOR circuit for combining said fourth data word with the product generated by said third alpha multiplier;

a fourth alpha multiplier connected to receive the word generated by said fourth XOR circuit for performing an arithmetic multiplication of the word generated by said fourth XOR circuit and a predefined fixed variable; and a feedback data path connecting said fourth alpha multiplier to the second input of said first XOR circuit for providing the product generated by said fourth alpha multiplier to said first XOR circuit.

7. In a data storage system, apparatus for generating an error correction code (ECC) during a data block transfer; said data block transfer comprising a series of four-word parallel data transfers, each parallel transfer including a first, second, third and fourth data word; said apparatus comprising:

a first exclusive-OR (XOR) circuit having a first input for receiving said first data word and a second input, said first XOR circuit for combining said first data word with a data word received at its second input;

a first alpha multiplier connected to receive the word generated by said first XOR circuit for performing an arithmetic multiplication of the word generated by said first XOR circuit and a predefined fixed variable;

a first data path selector having a first input connected to receive the product generated by said first alpha multiplier, a second input, and an output connected to the second input of said first XOR circuit;

a second exclusive-OR (XOR) circuit having a first input for receiving said second data word and a second input, said second XOR circuit for combining said second data word with a data word received at its second input;

a second alpha multiplier connected to receive the word generated by said second XOR circuit for performing an arithmetic multiplication of the word generated by said second XOR circuit and a predefined fixed variable;

a second data path selector having a first input connected to receive the product generated by said second alpha multiplier, a second input connected to receive the product generated by said first alpha multiplier, and an output connected to the second input of said second XOR circuit;

a third exclusive-OR (XOR) circuit having a first input for receiving said third data word and a second input, said third XOR circuit for combining said third data word with a data word received at its second input;

a third alpha multiplier connected to receive the word generated by said third XOR circuit for performing an arithmetic multiplication of the word generated by said third XOR circuit and a predefined fixed variable;

a third data path selector having a first input connected to receive the product generated by said third alpha multiplier, a second input connected to receive the product generated by said second alpha multiplier, and an output connected to the second input of said third XOR circuit;

a fourth exclusive-OR (XOR) circuit having a first input for receiving said fourth data word and a second input, said fourth XOR circuit for combining said fourth data word with a data word received at its second input;

a fourth alpha multiplier connected to receive the word generated by said fourth XOR circuit for performing an arithmetic multiplication of the word generated by said fourth XOR circuit and a predefined fixed variable, said fourth alpha multiplier being connected to the second input of said first data path selector to provide the product generated by said fourth alpha multiplier to the second input of said first data path selector; and a fourth data path selector having a first input connected to receive the product generated by said fourth alpha multiplier, a second input connected to receive the product generated by said third alpha multiplier, and an output connected to the second input of said fourth XOR circuit.

* * * * *